Oct. 8, 1957    J. C. FOSTER    2,808,941
ROTARY DISPLAY STAND FOR SUNGLASSES OR THE LIKE
Filed Oct. 22, 1953    3 Sheets-Sheet 2
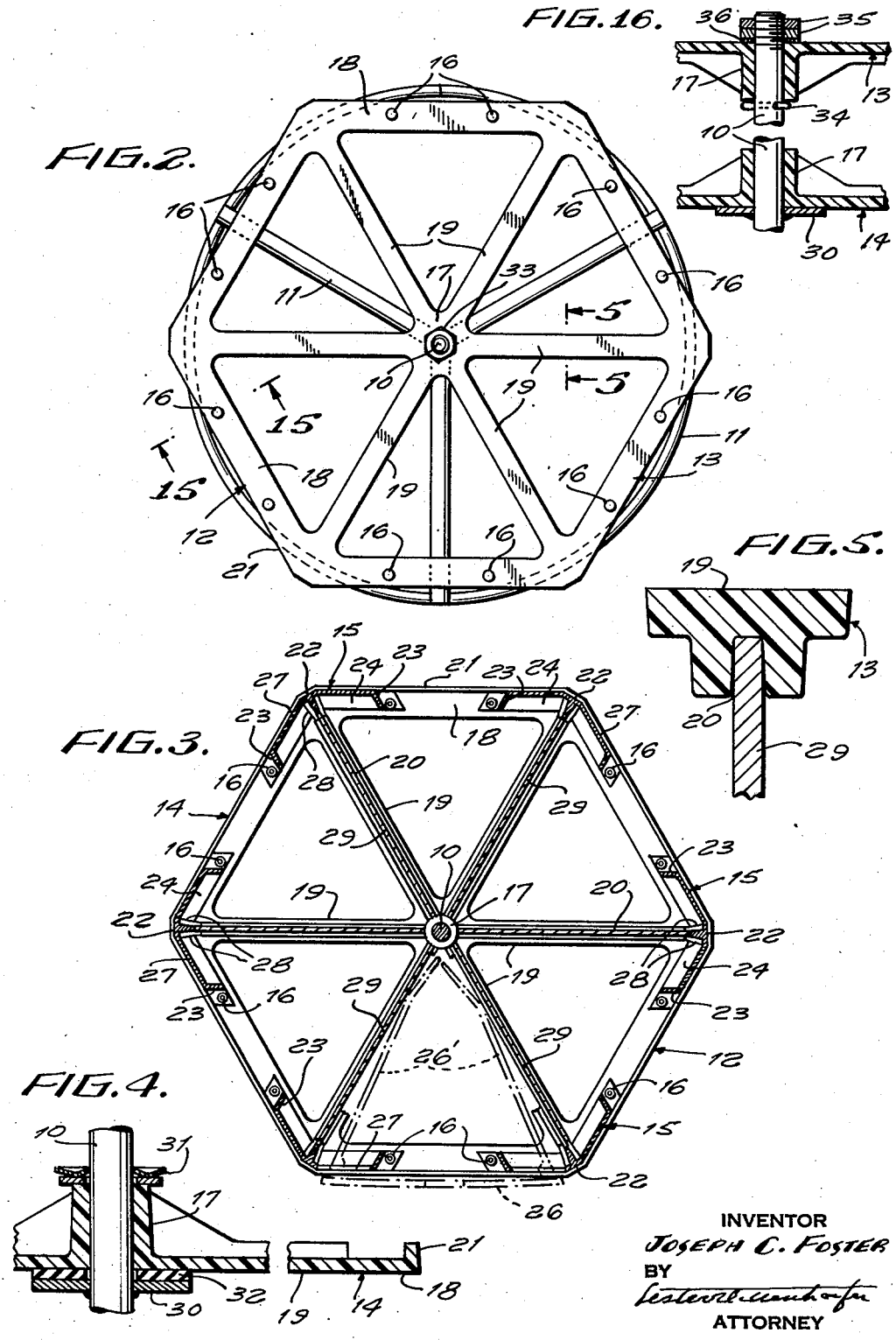
INVENTOR
JOSEPH C. FOSTER
BY
ATTORNEY Oct. 8, 1957 J. C. FOSTER 2,808,941
ROTARY DISPLAY STAND FOR SUNGLASSES OR THE LIKE
Filed Oct. 22, 1953 3 Sheets-Sheet 3
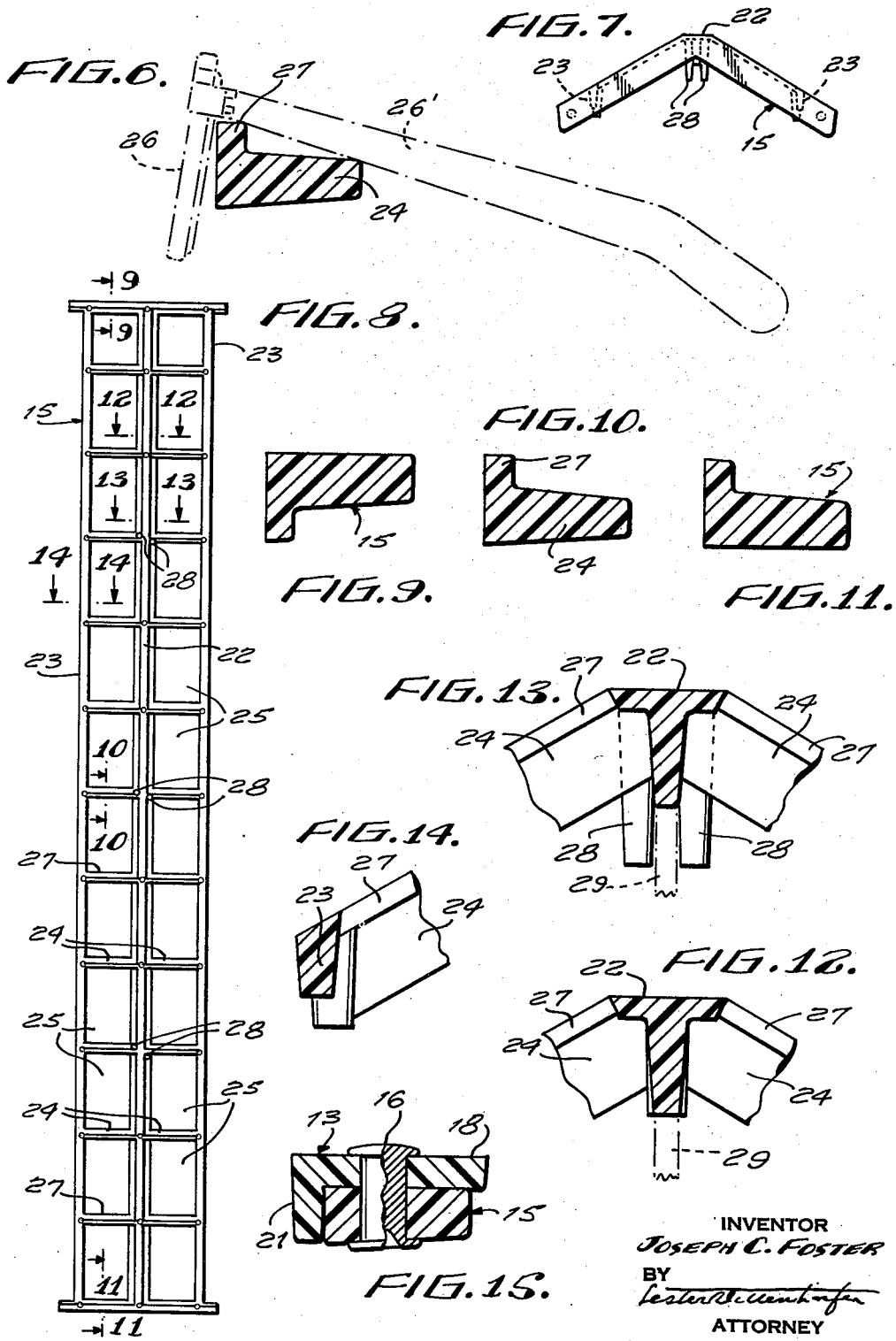
INVENTOR
JOSEPH C. FOSTER
BY
ATTORNEY

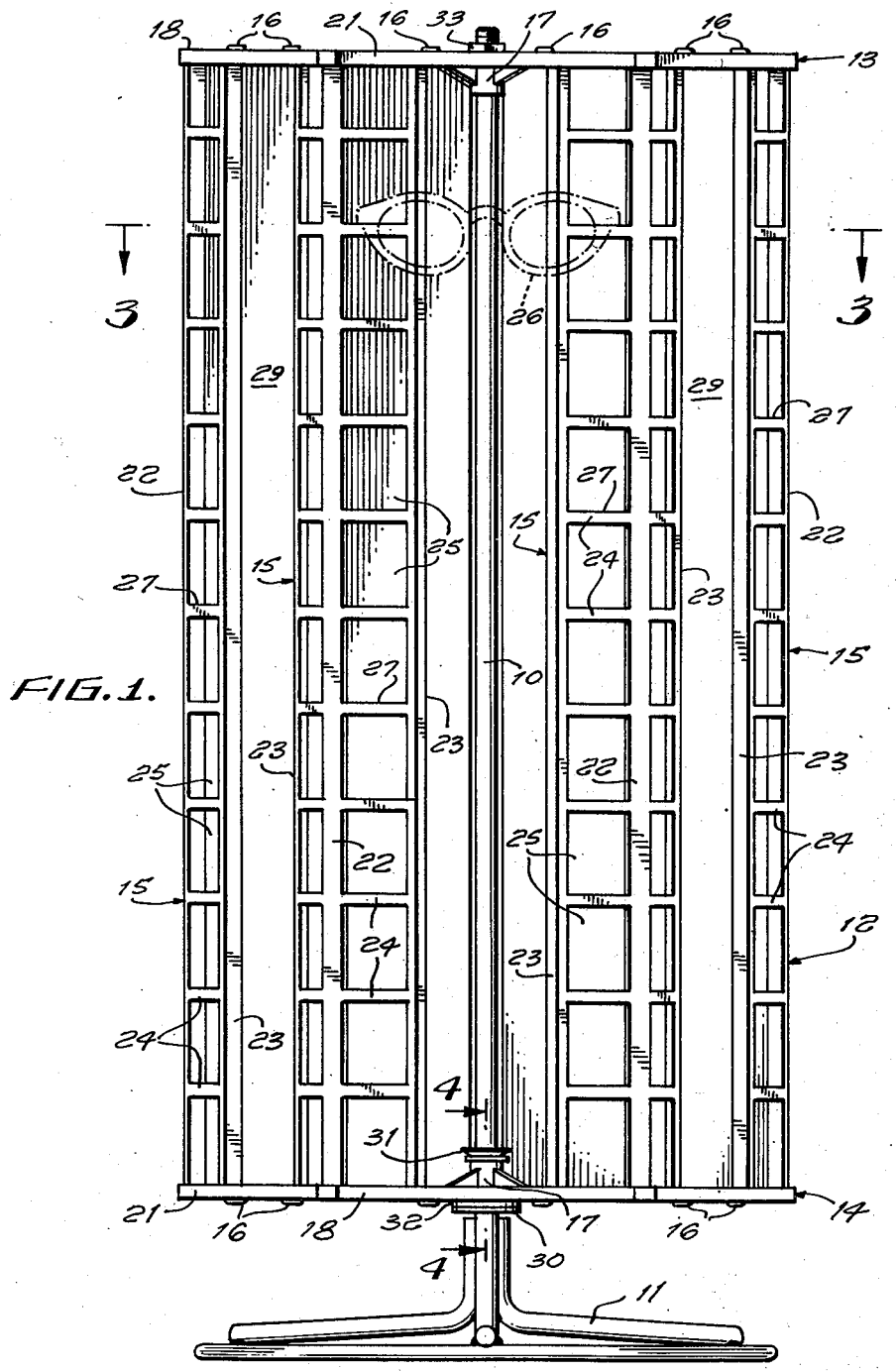

United States Patent Office 2,808,941
Patented Oct. 8, 1957

2,808,941

ROTARY DISPLAY STAND FOR SUNGLASSES OR THE LIKE

Joseph C. Foster, Leominster, Mass., assignor to Foster Grant Co. Inc., Leominster, Mass., a corporation of Massachusetts Application October 22, 1953, Serial No. 387,627

2 Claims. (Cl. 211—13)

This invention relates to a display stand for sunglasses, spectacles, and the like, having temples or ear bows that fit behind or over the ears, and more particularly to a rotary display stand for sunglasses.

Heretofore sunglasses have generally been displayed upon cards. To hold the glasses in place it has been necessary to fold the temples over each other on the back of the card. To remove any pair for inspection it has been necessary to unfold the temples, and if the particular pair was unsatisfactory for any reason, replacement on the card required that the temples be again folded to secure the glasses in place.

Often, customers would try to pull the glasses off the cards without first unfolding the temples. This would be likely to tear or mutilate the card or damage the glasses. These objections are avoided with my display stand.

These operations are a nuisance and time consuming with the result that pairs of glasses removed for inspection were frequently left on the counter of the store, and therefore necessitated that the salesman or other person replace them.

The primary object of my invention is to provide a self-service display stand that securely holds the glasses but from which any pair may be removed, or upon which it may be replaced, without necessity on the part of the prospective customer, or anyone else, to unfold or to fold the temples.

Moreover, because of the fact that in my stand the temples are automatically guided into proper position, the initial application of the sunglasses in the factory, or at the store where they are to be sold, is greatly facilitated.

Another object is to provide a display stand that permits of display of more glasses, while taking up less room on a counter or the like, than would the display of an equally large number of glasses with the cards, racks, or stands heretofore proposed.

Other objects and advantages of the invention will appear in the following description thereof, reference being had to the accompanying drawings in which:

Figure 1 is a view in elevation of a rotary display stand embodying the invention;

Fig. 2 is a top plan view thereof;

Fig. 3 is a cross-section on the line 3—3 of Fig. 1;

Fig. 4 is a fragmentary detail view taken on the line 4—4 of Fig. 1;

Fig. 5 is a view in cross-section on the line 5—5 of Fig. 2;

Fig. 6 is a view in cross-section of one of the cross-bars of the column showing the sunglass tilted backward to avoid falling off the stand, the sunglass being indicated in broken lines;

Fig. 7 is a top view of the column, shown in Fig. 8, but on a larger scale;

Fig. 8 is a rear view in elevation of one of the columns of the stand;

Figs. 9 to 14, inclusive, are enlarged sectional detail views of component parts of a column taken on the corresponding lines of Fig. 8;

Fig. 15 is a sectional view taken on the line 15—15 of Fig. 2; and

Fig. 16 is a fragmentary view, partly in section, showing a modified manner of rotatably fastening the stand to and on its vertical axis.

The display stand comprises a vertical axis 10 projecting upward from a base 11, and a frame 12 mounted to rotate on and about the axis. As shown, the frame is hexagonal in form but it may be made in various other forms or designs.

The frame 12 is preferably constructed of elements of molded plastic material although they may be made of other suitable material. It comprises top and bottom spiders 13 and 14, and a plurality of vertical columns 15. The two spiders are identical in form and construction, but reversed in position respectively to each other. The columns are secured at top and bottom to the spiders by rivets 16 or other fasteners.

Each spider has a central hub 17 and an outer rim portion 18 of hexagonal or other shape. Radial arms 19 extend from the hub to each angle of the rim. Each radial arm is formed with a longitudinal groove 20 in its inner surface, as shown in Fig. 5, and a flange 21 that extends around the outer edge of its rim 18. The columns 15 fit into and are attached to the spiders at the angles or corners of their rims.

The columns are preferably each of unitary construction comprising a central vertical angle-bar 22, two parallel side-bars 23, and a plurality of vertically spaced cross-bars 24 that connect the central and side-bars, and that together define openings 25 in the column. The column as a whole constitutes a skeleton framework upon the cross-bars of which the sunglasses are supported for display, in the manner hereinafter described. In the drawings, a sunglass 26, with its temples 26', is represented by broken lines.

Each of the cross-bars 24, as shown in Figs. 6 and 10, is formed with an upwardly extending projection or lip 27 at its front or outer edge for the purpose to be described. Extending slightly inward from the inner face of the central bar 22 are two fingers 28, as shown in Fig. 13. In the particular form of column shown in Fig. 8 these fingers extend inwardly from the central member at the third, sixth and ninth pair of cross-arms from the bottom of the column.

A sheet or piece of cardboard 29, or other suitable material, preferably of oblong shape, is inserted between each pair of opposed radial-arms of the top and bottom spiders and is held at its top and bottom edges in the grooves 20 of said arms. These sheets 29 are also confined at their outer edges between the fingers 28.

The frame 12 is of sturdy and inexpensive construction. Since the two spiders 13 and 14 are alike and interchangeable, and as the columns 15 are all identical, a minimum number of molds or dies and only a few operations are required to manufacture and assemble the parts of the frame.

The frame 12 rests upon a collar or protuberance 30 at the lower end of the axis 10 and may be rotatably fastened thereupon by a push-on washer 31, as shown in Figs. 1 and 4, and a rubber washer 32 may be inserted between the lower face of the hub and the collar 30. The upper end of the axis is threaded to receive a nut 33.

A modified, and preferred, manner of fastening the frame to its axis is shown in Fig. 16. In this instance, the frame is rotatably fastened to the axis at the top rather than at the bottom and, accordingly, the necessity of fastening it by the push-on fastener 31 is avoided.

A cotter pin 34 holds the top spider at the lower end of its hub and the frame is fastened by two jam or lock nuts 35 with a rubber washer 36 inserted between the spider and the lower nut. The nuts may be adjusted to allow slow rotation and to prevent free spinning of the frame.

The sheets 29 constitute walls that converge toward the axis 10 and that divide the frame into several compartments. The glasses 26 are applied to the stand with their temples 26' open or spread, the temples being inserted into the openings 25 of the frame to rest upon the cross-bars 24. The walls 29 serve to guide the temples automatically into partly folded condition as they are inserted into the openings of the frame.

In fully inserted position, the temples tilt or slant downwardly to rest upon the inner end of the cross-bar 24 and the upper end of its lip 27, as shown in Fig. 6. The front of the frame of the glasses overhangs the front face of the cross-bars. The center of gravity of the glasses is located behind said bars, and by reason thereof and the tilted position of the temples the glasses cannot accidentally fall off the frame.

Without the dividing walls the temples of adjacent sunglasses would contact and engage with one another and thus interfere with withdrawal of any pair of glasses. This is prevented by the walls and accordingly any pair of glasses may be readily and freely removed or replaced without disturbing the rest.

Various modifications in the configuration of the stand and the details of its construction may be made within the scope of the invention as herein illustrated and described.

What I claim is:

1. A rotary display stand for sunglasses or spectacles having temples, comprising a vertical axis, a hollow frame for supporting a plurality of the articles for display, said frame being mounted to rotate about the axis, and having similarly polygonal-shaped top and bottom members, said members being connected at intervals by vertical columns of angular cross-section corresponding substantially to the angles of said polygons, several columns being substantially alike, each consisting of a central vertical bar, parallel vertical side bars, and cross-bars between said vertical bars, the outer edge of each of said cross-bars being higher than its inner edge, all of the bars together defining a plurality of openings in each column, walls converging inwardly from said columns toward the axis, said walls dividing the interior of the frame into compartments, the cross-members and the walls providing guides that automatically tilt downwardly and turn the temples of a pair of glasses into partly folded position on insertion of the temples into said openings over the cross-bars and in contact with said walls.

2. A rotary display stand for sunglasses or spectacles having temples, comprising a vertical axis, a hollow frame for supporting a plurality of the articles for display, said frame being mounted to rotate about the axis, and having similarly polygonal-shaped top and bottom spiders having radial arms each formed with a longitudinal groove in its inner surface, said spiders being connected at intervals by vertical columns of angular cross-section corresponding substantially to the angles of said polygons, the several columns being substantially alike, each consisting of a central vertical bar, parallel vertical side bars, and cross-bars between said vertical bars, all of the bars together defining a plurality of openings in each column, said central bar having inwardly extending pairs of fingers, walls converging inwardly from said central bars toward the axis, said walls dividing the interior of the frame into compartments, and providing guides that automatically turn the temples of a pair of glasses into partly folded position on insertion of the temples into said openings and in contact with said walls, each wall being secured at its top and bottom edges in grooves of the corresponding spider arms and at its outer edge between the finger-pairs of the central bar of each column.

References Cited in the file of this patent

UNITED STATES PATENTS

| | | |
|---|---|---|
| D. 138,503 | Churchill | Aug. 15, 1944 |
| D. 174,172 | Foster | Apr. 8, 1955 |
| 383,551 | Barrows | May 29, 1888 |
| 515,580 | Forbes et al. | Feb. 27, 1890 |
| 716,116 | Scott | Dec. 16, 1902 |
| 1,393,050 | Talley et al. | Oct. 11, 1921 |
| 1,432,277 | Cahusac | Oct. 17, 1922 |
| 1,755,477 | Hunyady | Apr. 22, 1930 |
| 2,086,508 | Mueller | July 6, 1937 |

FOREIGN PATENTS

| | | |
|---|---|---|
| 19,496 | Great Britain | 1897 |
| 24,691 | Great Britain | 1894 |